US008314600B2

(12) United States Patent
Chiang (10) Patent No.: US 8,314,600 B2
(45) Date of Patent: Nov. 20, 2012

(54) CONSTANT CURRENT DRIVING SYSTEM WITH STABLE OUTPUT CURRENT

(75) Inventor: Yung-Hsin Chiang, Taipei County (TW)

(73) Assignee: IML International, Grand Cayman (KY)

( * ) Notice: Subject to any disclaimer, the term of this patent is extended or adjusted under 35 U.S.C. 154(b) by 477 days.

(21) Appl. No.: 12/754,616

(22) Filed: Apr. 6, 2010

(65) Prior Publication Data

US 2010/0253308 A1     Oct. 7, 2010

(30) Foreign Application Priority Data

Apr. 6, 2009  (TW) ................................. 98111416 A (51) Int. Cl.
  *G05F 1/565*     (2006.01)
(52) U.S. Cl. .......................... 323/285; 323/284; 323/288
(58) Field of Classification Search .................. 323/285, 323/288, 284, 283
  See application file for complete search history.

(56) References Cited

U.S. PATENT DOCUMENTS

| 6,130,528 | A  | * | 10/2000 | Aoyama ........................ 323/282 |
| 6,137,702 | A  | * | 10/2000 | Hall et al. ........................ 363/95 |
| 8,129,973 | B2 | * | 3/2012  | Xi et al. ........................ 323/285 |

* cited by examiner

*Primary Examiner* — Harry Behm
(74) *Attorney, Agent, or Firm* — Winston Hsu; Scott Margo (57) ABSTRACT

Constant current driving circuit includes a latch, an ON timer, and an OFF timer. The latch outputs a switch control signal according to an ON signal and an OFF signal for controlling a power switch. The power switch is coupled between an input voltage source and an inductor. When the switch control signal controls the power switch to turn on/off, the input voltage source is able/unable to couple to the inductor through the power switch. The inductor provides an output current and an output voltage. The ON timer detects if the output current reaches a peak value for accordingly outputting the OFF signal. The OFF timer outputs the ON signal according to the output voltage and the switch control signal for control the interval of the switch control signal representing "OFF".

13 Claims, 9 Drawing Sheets

CONSTANT CURRENT DRIVING SYSTEM WITH STABLE OUTPUT CURRENT

BACKGROUND OF THE INVENTION

1. Field of the Invention

The present invention is related to a constant current driving circuit, and more particularly, to a constant current driving circuit that utilizes an input/output voltage to control ON/OFF time of a power switch of the constant current driving system to stabilize output current of the constant current driving circuit.

2. Description of the Prior Art

Figure 1:
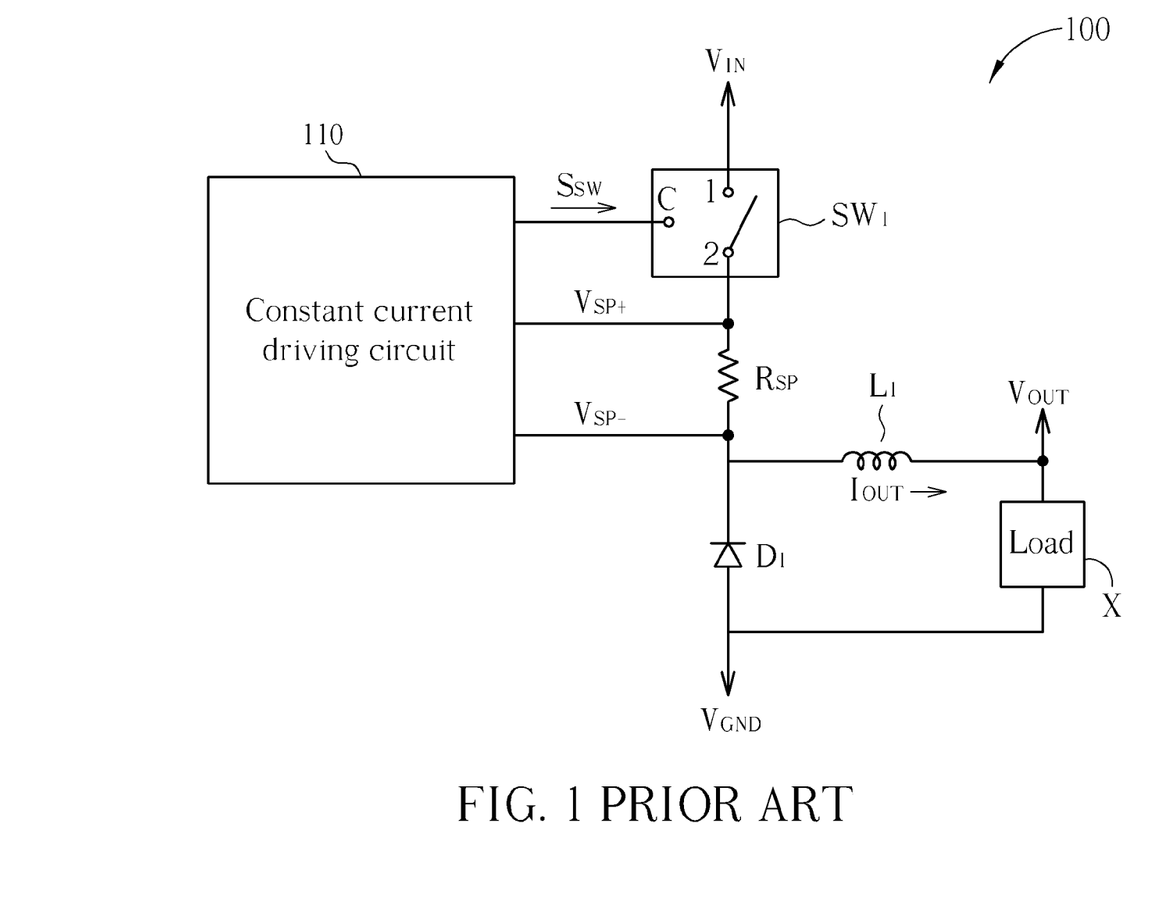
FIG. 1 is a diagram illustrating a conventional constant current driving system.

Please refer to FIG. 1. FIG. 1 is a diagram illustrating a conventional constant current driving system 100. As illustrated in FIG. 1, the constant current driving system 100 comprises a constant current driving circuit 110, a power switch $SW_1$, an inductor $L_1$, a peak current sensing resistor $R_{SP}$, and a diode $D_1$. The constant current driving system 100 is utilized to convert an input voltage source $V_{IN}$ to provide output current $I_{OUT}$ and output voltage $V_{OUT}$ to the load X. The constant current driving circuit 110 outputs a switch control signal $S_{SW}$ for controlling the power switch $SW_1$ to be on (closed) or off (open). The constant current driving circuit 110 utilizes sensing voltages $V_{SP+}$ and $V_{SP-}$ provided by the peak current sensing resistor $R_{SP}$ to control the ON time $T_{ON}$ of the power switch $SW_1$; the constant current driving circuit 110 controls the OFF time $T_{OFF}$ of the power switch $SW_1$ to have a fixed duration $T_P$. More specifically, when the difference between the sensing voltages $V_{SP+}$ and $V_{SP-}$ is lower than a predetermined value, the output current $I_{OUT}$ is determined to be less than a predetermined peak threshold value $I_P$, so the constant current driving circuit 110 outputs the switch control signal $S_{SW}$ representing "ON" (i.e. the switch control signal $S_{SW}$ is asserted) to the power switch $SW_1$ to turn on the power switch $SW_1$, and the input voltage source $V_{IN}$ is then coupled to the inductor $L_1$ for charging the inductor $L_1$, subsequently increasing the output current $I_{OUT}$; when the difference between the sensing voltages $V_{SP+}$ and $V_{SP-}$ equals the predetermined value, the output current $I_{OUT}$ is determined to have reached the predetermined peak threshold value $I_P$, so the constant current driving circuit 110 outputs the switch control signal $S_{SW}$ representing "OFF" (i.e. the switch control signal $S_{SW}$ is unasserted) to the power switch $SW_1$ to turn off the power switch $SW_1$ for the inductor $L_1$ to start discharging, subsequently decreasing the output current $I_{OUT}$; the OFF time $T_{OFF}$ of the power switch $SW_1$ has the fixed duration $T_P$, meaning the constant current driving circuit 110 turns on the power switch $SW_1$ again after the fixed duration $T_P$, so the inductor $L_1$ restarts charging to increase the output current $I_{OUT}$. This way, by controlling the on/off operation of the power switch $SW_1$ with the constant current driving circuit 110, the charging/discharging operation of the inductor $L_1$ can be controlled for the average value of the output current $I_{OUT}$ to equal a target current $I_{TARGET}$, achieving the object of constant current control.

Figure 2:
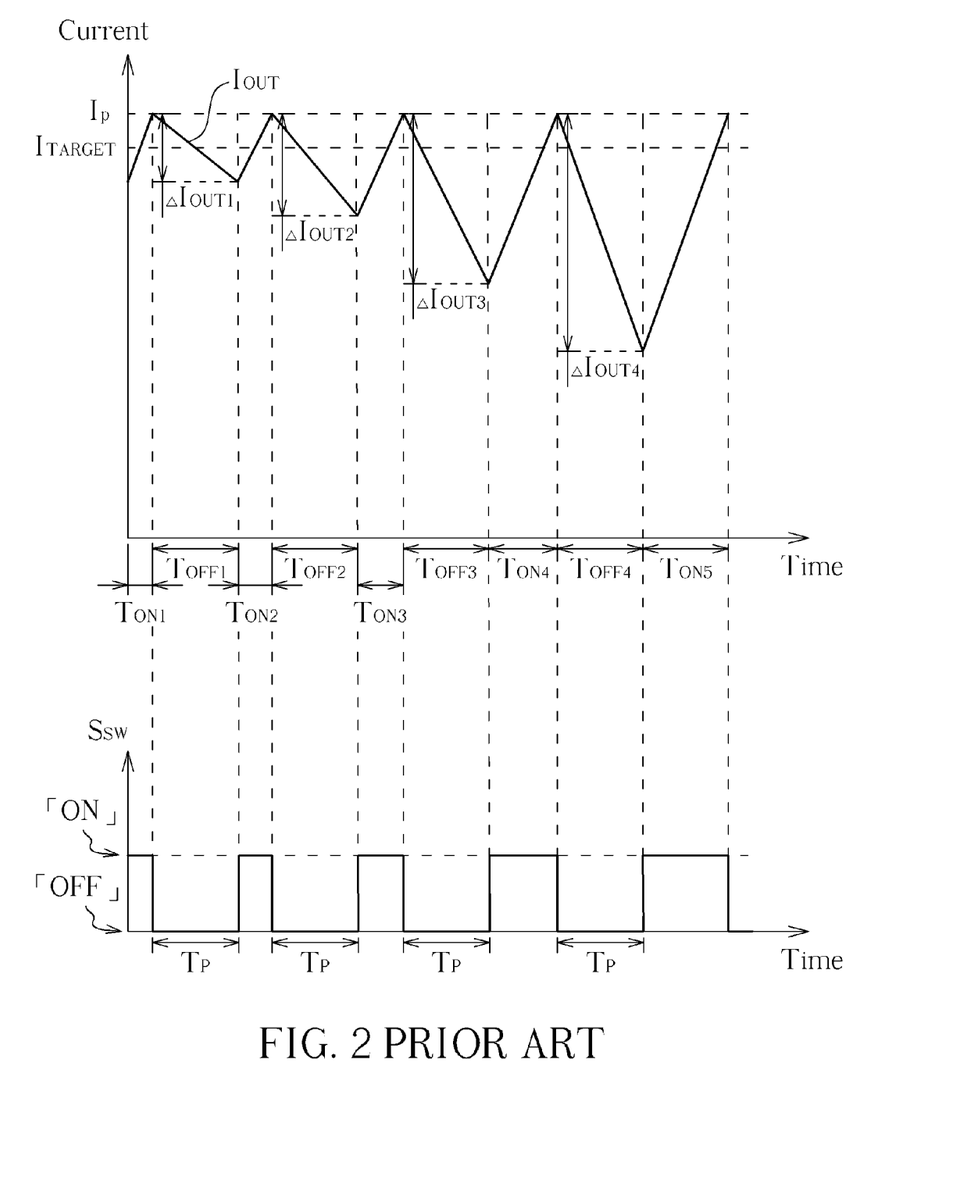
FIG. 2 is a timing diagram illustrating the output current provided by the conventional constant current driving circuit.

Please refer to FIG. 2. FIG. 2 is a timing diagram illustrating the output current $I_{OUT}$ provided by the conventional constant current driving circuit. As illustrated in FIG. 2, when the output current $I_{OUT}$ has not reached the predetermined peak threshold value $I_P$, the switch control signal $S_{SW}$ is represented as "ON" for turning on the power switch $SW_1$ and the output current $I_{OUT}$ is increased (such as during the durations $T_{ON1}$, $T_{ON2}$, $T_{ON3}$, $T_{ON4}$ and $T_{ON5}$); when the output current $I_{OUT}$ has reached the peak threshold value $I_P$, the switch control signal $S_{SW}$ is represented as "OFF", and the OFF time equals a fixed duration $T_P$ (such as the durations $T_{ON1}$, $T_{ON2}$, $T_{ON3}$ and $T_{ON4}$). However, if the load X is varied (e.g. continuously increasing), the discharging rate of the inductor $L_1$ during the OFF time $T_{OFF}$ of the power switch $SW_1$ is increased, and since the OFF time $T_{OFF}$ of the power switch $SW_1$ is of the fixed duration $T_P$, the current is decreased to a further extent. As illustrated in FIG. 2, if the load X increases continuously, the variation of the output current $I_{OUT}$ tends to increase accordingly, say, from $\Delta I_{OUT1}$, $\Delta I_{OUT2}$ and $\Delta I_{OUT3}$ to $\Delta I_{OUT4}$. This way, the ripple current of the output current $I_{OUT}$ is also increased, consequently lowering the stability of the output current $I_{OUT}$ and causing inconvenience to the user.

SUMMARY OF THE INVENTION

The present invention discloses a constant current driving system for stabilizing an output current. The constant current driving system comprises a power switch, an inductor, a first diode and a constant current driving circuit. The power switch comprises a first end coupled to an input voltage source, a second end and a control end, for receiving a switch control signal, wherein the input voltage source provides an input voltage and wherein when the switch control signal is asserted, the first end of the power switch is coupled to the second end of the power switch. The inductor comprises a first end and a second end for providing an output current and an output voltage. The first diode comprises a negative end coupled to the first end of the inductor, and a positive end coupled to a ground end. The constant current driving circuit comprises a latch, an ON timer, an OFF timer and a load. The latch comprises an output end for outputting the switch control signal, a set end for receiving an ON signal and a reset end for receiving an OFF signal, wherein the latch outputs the switch control signal according to the ON signal and the OFF signal. The ON timer is for detecting whether the output current has reached a predetermined peak current value, and generating the OFF signal accordingly. The OFF timer is for outputting the ON signal to control a time for which the switch control signal is unasserted according to the output voltage and the switch control signal. The load is coupled between the second end of the inductor and the ground end of the constant current driving system. The ON timer comprises a peak current sensing resistor and a first comparator. The peak current sensing resistor comprises a first end coupled to the second end of the power switch for generating a peak current sensing voltage, a second end coupled to the first end of the inductor for generating a reference voltage source. The first comparator comprises a first input end for receiving the peak current sensing voltage, a second input end for receiving a turn-on threshold voltage, and an output end coupled to the reset end of the latch for outputting the OFF signal, wherein a difference between the turn-on threshold voltage and a voltage generated by the reference voltage source is a constant. When the peak current sensing voltage is higher than the turn-on threshold voltage, the first comparator outputs the OFF signal representing turn off.

The present invention further discloses a constant current driving system for stabilizing an output current. The constant current driving system comprises a power switch, an inductor, a first diode and a constant current driving circuit. The power switch comprises a first end coupled to an input voltage source, a second end, and a control end for receiving a switch control signal, wherein the input voltage source provides an input voltage. When the switch control signal is asserted, the first end of the power switch is coupled to the second end of the power switch. The inductor comprises a first end coupled to the second end of the power switch, and a second end for providing an output current and an output voltage. The first diode comprises a negative end coupled to the first end of the inductor and a positive end coupled to a ground end. The constant current driving circuit comprises a latch, an OFF timer, an ON timer and a load. The latch comprises an output end for outputting the switch control signal, a set end for receiving an ON signal, and a reset end, for receiving an OFF signal, wherein the latch outputs the switch control signal according to the ON signal and the OFF signal. The OFF timer is for detecting whether the output current has reached a predetermined valley current value, and generating the ON signal accordingly. The ON timer is for outputting the OFF signal according to the output voltage, the input voltage and the switch control signal, so as to control time for which the switch control signal is unasserted. The load is coupled to the second end of the inductor and the ground end. The OFF timer comprises a valley current sensing resistor, a first comparator and a first inverse switch. The valley current sensing resistor comprises a first end coupled to the positive end of the first diode for generating a valley current sensing voltage, and a second end coupled to a ground end. The first comparator comprises a first input end for receiving the valley current sensing voltage, a second input end for receiving a turn-off threshold voltage, and an output end, for outputting the ON signal, wherein a difference between the turn-off threshold voltage and a voltage provided by the ground end is a constant, and the turn-off threshold voltage is lower than the voltage provided by the ground end. When the valley current sensing voltage is higher than the turn-off threshold voltage, the first comparator outputs the ON signal representing turn on. The first inverse switch comprises a first end coupled to the set end of the latch, a second end coupled to the output end of the first comparator, and a control end coupled to the output end of the latch, for receiving the switch control signal, wherein when the switch control signal is represented as OFF, the first end of the inverse switch is coupled to the second end of the first inverse switch;

These and other objectives of the present invention will no doubt become obvious to those of ordinary skill in the art after reading the following detailed description of the preferred embodiment that is illustrated in the various figures and drawings.

DETAILED DESCRIPTION

Therefore, one object is to provide a constant current driving circuit, for lowering the ripple current of the output current to increase the stability of the output current.

At least two embodiments of the driving method are provided: 1. controlling ON time of a power switch by detecting a peak threshold value of an output current, and utilizing an output voltage to control OFF time of the power switch; 2. controlling the OFF time of the power switch by detecting a valley threshold value of the output current, and utilizing an input voltage and the output voltage to control the ON time of the power switch. The at least two embodiments of the driving method mentioned above are able to lower the ripple current of the output current and increase the stability of the output current.

Figure 3:
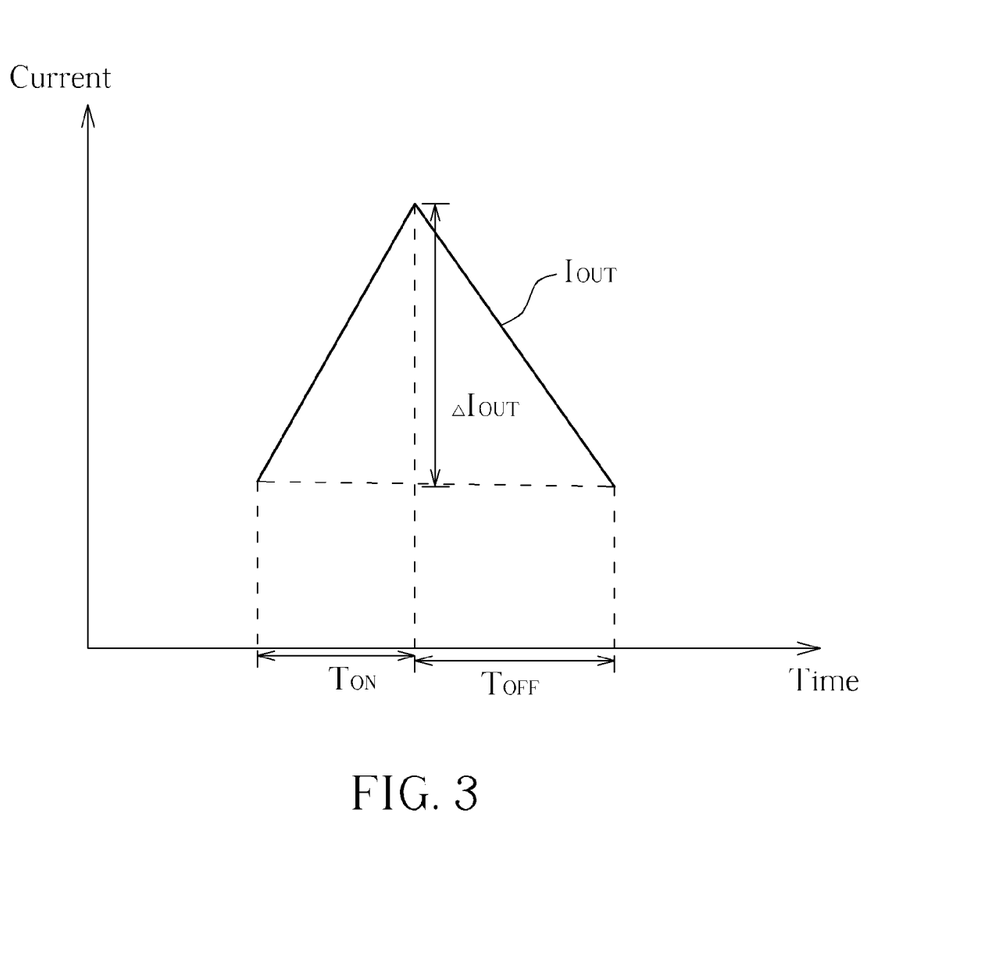
FIG. 3 is a diagram illustrating charging/discharging operation of the output current at ON/OFF time.

Please refer to FIG. 3. FIG. 3 is a diagram illustrating charging/discharging operation of the output current $I_{OUT}$ at ON/OFF time. When the power switch is turned on, the inductor starts charging and the increased current of the output current $I_{OUT}$ can be represented by the formula below:

$$66\, I_{OUT\_ON} = [(V_{IN} - V_{OUT})/L] \times T_{ON} \quad (1);$$

When the power switch is turned off, the inductor starts discharging and the decreased current of the output current $I_{OUT}$ can be represented by the formula below:

$$\Delta I_{OUT\_OFF} = [V_{OUT}/L] \times T_{OFF} \quad (2);$$

where $\Delta I_{OUT\_ON}$ represents the increased current for the output current $I_{OUT}$, $\Delta I_{OUT\_OFF}$ represents the decreased current for the output current $I_{OUT}$, $V_{OUT}$ represents the output voltage, L represents the inductance, $T_{ON}$ represents the ON time of the power switch, and $T_{OFF}$ represents the OFF time of the power switch. Since the average value of the output current $I_{OFF}$ should equal the target current $I_{TARGET}$ (i.e. a constant current), hence:

$$\Delta I_{OUT\_ON} = \Delta I_{OUT\_OFF} = \Delta I_{OUT} \quad (3);$$

The following formula can then be obtained according to the formulae (1) and (2) above:

$$\Delta I_{OUT} = [(V_{IN} - V_{OUT})/L] \times T_{ON} = [V_{OUT}/L] \times T_{OFF} \quad (4);$$

According to formula (4), the current variation $\Delta I_{OUT}$ of the output current $I_{OUT}$ is directly proportional to the output voltage $V_{OUT}$ when the inductance L is of a constant value and the OFF time $T_{OFF}$ is of the fixed duration $T_P$. Therefore, if the output voltage $V_{OUT}$ is utilized to control the OFF time $T_{OFF}$, the current variation $\Delta I_{OUT}$ of the output current $I_{OUT}$ can be effectively controlled as represented by the formula below:

$$T_{OFF} = K \times R_{OFF} / V_{OUT} \quad (5);$$

where K is a constant, and $R_{OFF}$ represents a resistance value (i.e. constant). Merging formula (5) into (4), the following formula can be obtained:

$$\Delta I_{OUT} = [(V_{IN} - V_{OUT})/L] \times T_{ON} \quad (6)$$
$$= [V_{OUT}/L] \times T_{OFF}$$
$$= [V_{OUT}/L] \times [K \times R_{OFF}/V_{OUT}]$$
$$= K \times R_{OFF}/L \ldots ;$$

According to formula (6), if the OFF time $T_{OFF}$ is set to be inversely proportional to the output voltage $V_{OUT}$, the decreased current $\Delta I_{OUT\_OFF}$ of the output current $I_{OUT}$ is then of a constant value (with K, $R_{OFF}$ and L all being constant), and since the increased current $\Delta I_{OUT\_ON}$ of the output current $I_{OUT}$ equals the decreased current $\Delta I_{OUT\_OFF}$ of the output current $I_{OUT}$, the ripple current of the output current $I_{OUT}$ can then be controlled to within a predetermined range, and the stability of the output current is improved.

Figure 4:
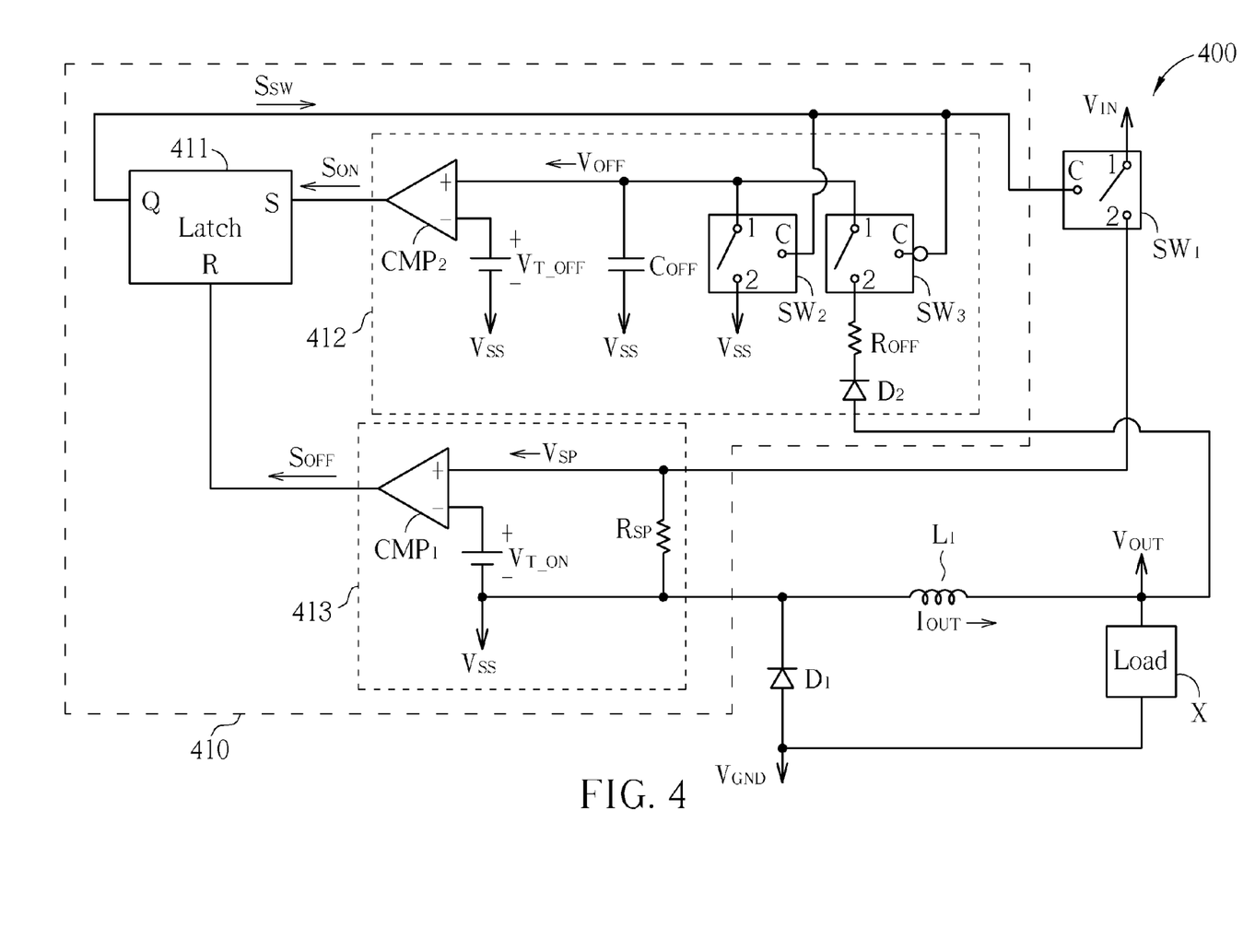
FIG. 4 is a diagram illustrating a constant current driving system according to a first embodiment of the present invention.

Please refer to FIG. 4. FIG. 4 is a diagram illustrating a constant current driving system 400 according to a first embodiment of the present invention. The constant current driving system 400 comprises a constant current driving circuit 410, a power switch $SW_1$, an inductor $L_1$ and a diode $D_1$. The constant current driving system 400 is utilized to convert an input voltage source $V_{IN}$ to provide an output current $I_{OUT}$ and an output voltage $V_{OUT}$ to a load X. The diode $D_1$ is coupled between the first end of an inductor $L_1$ and a reference voltage source $V_{GND}$; the load X is coupled between the output voltage source $V_{OUT}$, a second end of the inductor $L_1$ and the reference voltage source $V_{GND}$. The reference voltage source $V_{GND}$ can be a ground end of the constant current driving system 400. The constant driving circuit 410 outputs the switch control signal $S_{SW}$ for controlling the power switch $SW_1$ to be turned on (closed) or off (open). The constant current driving circuit 410 detects the peak value of the output current $I_{OUT}$ for controlling the ON time $T_{ON}$ of the power switch $SW_1$; the constant current driving circuit 410 controls the OFF time $T_{OFF}$ of the power switch $SW_1$ according to the output voltage $V_{OUT}$. The detailed operational principle is explained below.

The constant current driving circuit 410 comprises a latch 411, an OFF timer 412 and an ON timer 413.

The latch 411 comprises a set end S, a reset end R and an output end Q. According to the signal received at the set end S and the reset end R, the latch 411 outputs the switch control signal $S_{SW}$ to a control end C of power switch $SW_1$ via an output end Q, so as to turn on (i.e. the first end 1 of the power switch $SW_1$ is coupled to the second end 2 of the power switch $SW_1$) and turn off (i.e. the first end 1 of the power switch $SW_1$ is not coupled to the second end 2 of the power switch $SW_1$) the power switch $SW_1$. When the latch 411 outputs the switch control signal $S_{SW}$ representing "ON" (e.g. logic "1"), the power switch $SW_1$ is turned on for the inductor $L_1$ to be in the charging state and the output current $I_{OUT}$ continues to increase; when the latch 411 outputs the switch control signal $S_{SW}$ representing "OFF" (e.g. logic "0"), the power switch $SW_1$ is turned off for the inductor $L_1$ to be in the discharging state and the output current $I_{OUT}$ continues to decrease.

The ON timer 413 comprises a peak current sensing resistor $R_{SP}$ and a comparator $CMP_1$. A first end of the peak current sensing resistor $R_{SP}$ is coupled between a second end 2 of the power switch $SW_1$ and a positive input end of the comparator $CMP_1$, for providing a peak current sensing voltage $V_{SP}$; a second end of the peak current sensing resistor $R_{SP}$ is coupled to the first end of the inductor $L_1$ for providing a reference voltage $V_{SS}$, wherein the reference voltage source $V_{SS}$ can be utilized as the ground end of the constant current driving circuit 410. The negative input end of the comparator $CMP_1$ is utilized to receive the turn-on threshold voltage $V_{T\_ON}$ (i.e. constant). The comparator $CMP_1$ compares the peak current sensing voltage $V_{SP}$ and the turn-on threshold voltage $V_{T\_ON}$ for outputting the corresponding OFF signal $S_{OFF}$ accordingly. When the peak current sensing voltage $V_{SP}$ is lower than the turn-on threshold voltage $V_{T\_ON}$, it means the output current $I_{OUT}$ has not reached the predetermined peak threshold value $I_P$, so the comparator $CMP_1$ outputs the OFF signal $S_{OFF}$ (e.g. logic "0"), which represents "do not turn off"; when the peak current sensing voltage $V_{SP}$ is higher than the turn-on threshold voltage $V_{T\_ON}$, it means the output current $I_{OUT}$ has reached the predetermined peak threshold value $I_P$, so the comparator $CMP_1$ outputs the OFF signal $S_{OFF}$ (e.g. logic "1"), which represents "turn off".

The OFF timer 412 comprises a comparator $CMP_2$, a turn-off capacitor $C_{OFF}$, a switch $SW_2$, an inverse switch $SW_3$, a turn-off resistor $R_{OFF}$ and a diode $D_2$.

The positive input end of the comparator $CMP_2$ is utilized to receive the turn-off voltage $V_{OFF}$; the negative end of the comparator $CMP_2$ is utilized to receive the turn-off threshold voltage $V_{T\_OFF}$ (i.e. constant); the comparator $CMP_2$ compares the turn-off voltage $V_{OFF}$ and the turn-off threshold voltage $V_{T\_OFF}$ for outputting the corresponding ON signal $S_{ON}$. When the turn-off voltage $V_{OFF}$ is lower than the turn-off threshold voltage $V_{T\_OFF}$, it means the OFF time $T_{OFF}$ of the power switch $SW_1$ has not finished, so the comparator $CMP_2$ outputs the ON signal (e.g. logic "0"), which represents "do not turn on"; when the turn-off voltage $V_{OFF}$ is higher than the turn-off threshold voltage $V_{T\_OFF}$, it means the OFF time $T_{OFF}$ of the power switch $SW_1$ has finished, so the comparator $CMP_2$ outputs the ON signal (e.g. logic "1"), which represents "turn on".

The turn-off capacitor $C_{OFF}$ is coupled between the positive end of the comparator $CMP_2$ and the voltage source $V_{SS}$; the switch $SW_2$ is coupled between the positive end of the comparator $CMP_2$ and the voltage source $V_{SS}$; the inverse switch $SW_3$ is coupled to the positive end of the comparator $CMP_2$ and the inverse switch $SW_2$ is coupled to the output voltage source $V_{OUT}$ via the turn-off resistor $R_{OFF}$ and the diode $D_2$. The control ends C of the switch $SW_2$ and the inverse switch $SW_3$ are both coupled to the output end Q of the latch 411 for receiving the switch control signal $S_{SW}$. Furthermore, the diode $D_2$ is utilized to prevent the voltage from being drained from the turn-off capacitor when the output voltage $V_{OUT}$ is lower than the turn-off voltage $V_{OFF}$.

When the switch control signal $S_{SW}$ is represented as "turn on" (e.g. logic "1"), the switch $SW_2$ is turned on to couple the positive input end of the comparator $CMP_2$ to the voltage source $V_{SS}$, and starts charging the turn-off capacitor $C_{OFF}$ for pulling the turn-off voltage $V_{OFF}$ to the voltage level of the voltage source $V_{SS}$; the inverse switch $SW_3$ is turned off so the output voltage source $V_{OUT}$ is not coupled to the positive input end of the comparator $CMP_2$ via the diode $D_2$ and the turn-off resistor $R_{OFF}$ to charge the turn-off capacitor $C_{OFF}$; this way, the turn-off voltage $V_{OFF}$ continues to stay lower than the turn-off threshold voltage $V_{T\_OFF}$ so the OFF timer 412 continues to output the ON signal $S_{ON}$ (e.g. logic "0"), which represents "do not turn on".

When the switch control signal $S_{SW}$ is represented as "turn off" (e.g. logic "0"), the switch $SW_2$ is turned off so the turn-off capacitor $C_{OFF}$ is not discharged by the voltage source $V_{SS}$ and the turn-off voltage $V_{OFF}$ is not pulled to the voltage level of the voltage source $V_{SS}$; the inverse switch $SW_3$ is turned on so the output voltage source $V_{OUT}$ is coupled to the positive input end of the comparator $CMP_2$ via the diode $D_2$ and the turn-off resistor $R_{OFF}$, to charge the turn-off capacitor $C_{OFF}$ for the turn-off voltage $V_{OFF}$ to continue increasing until the turn-off voltage $V_{OFF}$ is higher than the turn-off threshold voltage $V_{T\_OFF}$, at which time the OFF timer 412 outputs the ON signal $S_{ON}$ (e.g. logic "1"), which represents "turn on"; the OFF time $T_{OFF}$ of the power switch $SW_1$ is equivalent to the duration from when the above mentioned turn-off capacitor $C_{OFF}$ starts charging to the instant when the turn-off voltage $V_{OFF}$ is equal to the turn-off threshold voltage $V_{T\_OFF}$. The OFF time $T_{OFF}$ of the power switch $SW_1$ can be calculated as below:

$$T_{OFF} = C_{OFF} \times V_{T\_OFF}/(V_{OUT}/R_{OFF}) = K_1 \times R_{OFF}/V_{OUT} \quad (7)$$

where $K_1$ represents a constant (i.e. $C_{OFF} \times V_{T\_OFF}$). Therefore the ripple current of the output current driven by the constant current driving circuit 410 can be represented as:

$$\Delta I_{OUT\_OFF} = [V_{OUT}/L] \times T_{OFF} \quad (8)$$
$$= [V_{OUT}/L] \times [K_1 \times R_{OFF}/V_{OUT}]$$
$$= K_1 \times R_{OFF}/L \dots ;$$

Since $K_1$, $R_{OFF}$ and L are all constants, so the ripple current of the output current $I_{OUT}$ can be controlled to within a predetermined range for stabilizing the output current $I_{OUT}$.

When the set end S of the latch 411 receives the ON signal $S_{ON}$ (e.g. logic "1"), which represents "turn on" from the OFF timer 412, the latch 411 outputs the switch control signal $S_{SW}$ (e.g. logic "1"), which represents "ON" at the output end Q; when the reset end R of the latch 411 receives the OFF signal $S_{OFF}$ (e.g. logic "1"), which represents "turn off" from the ON timer 413, the latch 411 outputs the switch control signal $S_{SW}$ (e.g. logic "0"), which represents "OFF" at the output end Q.

Figure 5:
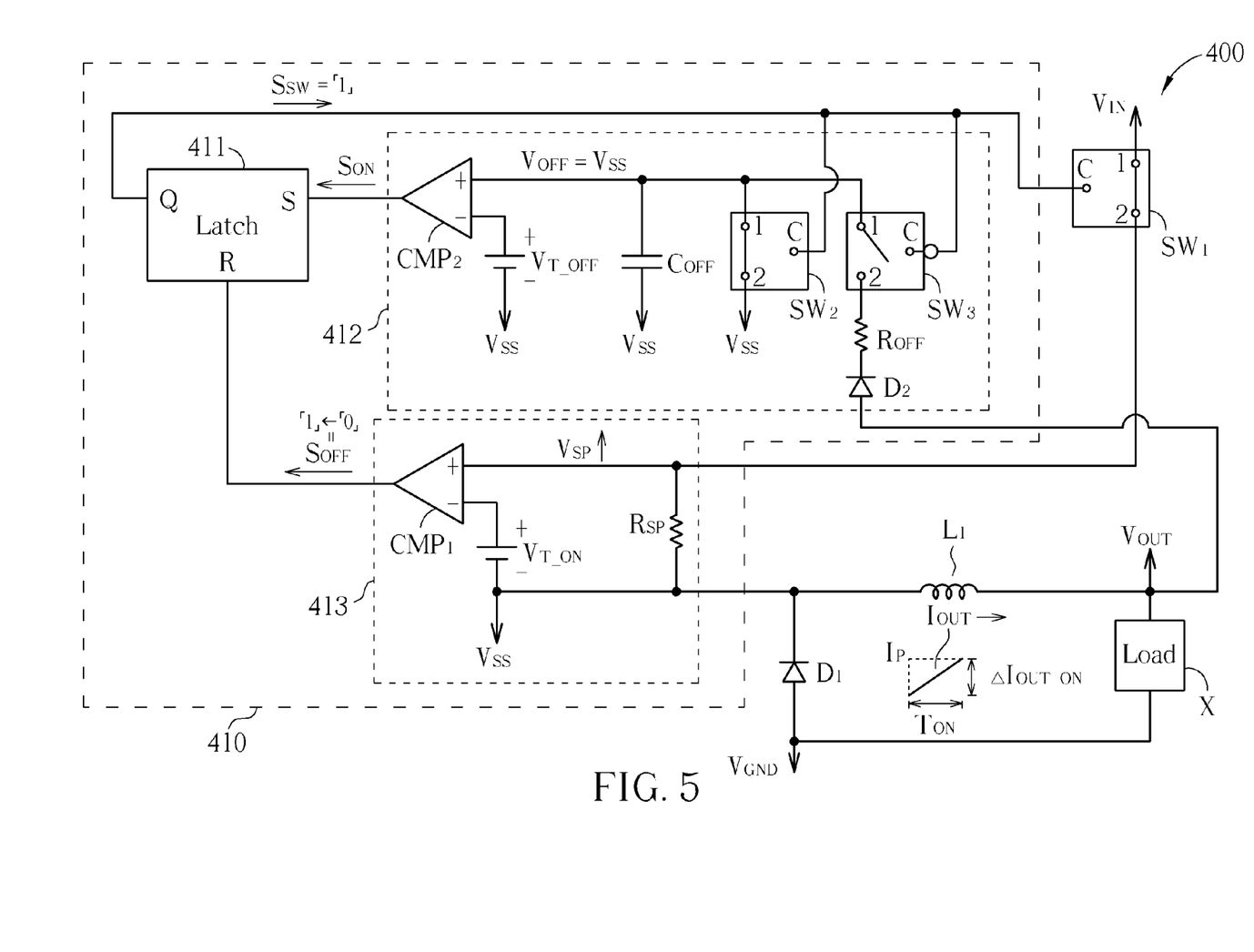
FIG. 5 is a diagram illustrating when the constant current driving system of FIG. 4 is in the charging state.

Please refer to FIG. 5. FIG. 5 is a diagram illustrating when the constant current driving system 400 is in the charging state. As illustrated in FIG. 5, the power switch $SW_1$ is turned on in the charging state. In other words, during the ON time $T_{ON}$, the power switch $SW_1$ is turned on, the switch control signal $S_{SW}$ represents "ON" (e.g. logic "1"), the switch $SW_2$ is turned on and the inverse switch $SW_3$ is turned off. Under this state (the latch 411 outputting the switch control signal $S_{SW}$ which represents "ON", and the power switch $SW_1$ being turned on), the OFF timer 412 can be considered non-operational, and the ON timer 413 is activated for continuously comparing the peak current sensing voltage $V_{SP}$ (as detected from the output current $I_{OUT}$) and the turn-on threshold voltage $V_{T\_ON}$. During the ON time $T_{ON}$, since the inductor $L_1$ is charged by the output voltage source $V_{IN}$, the output current $I_{OUT}$ is increased continuously, meaning the peak current sensing voltage $V_{SP}$ is also increased continuously. When the peak current sensing voltage $V_{SP}$ is higher than the turn-on threshold voltage $V_{T\_ON}$, it means the charging has completed (i.e. the output current $I_{OUT}$ has reached the predetermined peak threshold value $I_P$), and the ON timer 413 outputs the OFF signal $S_{OFF}$ which represents "turn off" (i.e. logic "1") to the reset end R of the latch 411 for resetting the switch control signal $S_{SW}$ to represent "OFF" (i.e. logic "0"); the ON time $T_{ON}$ is ended at this instant and the OFF time $T_{OFF}$ begins.

Figure 6:
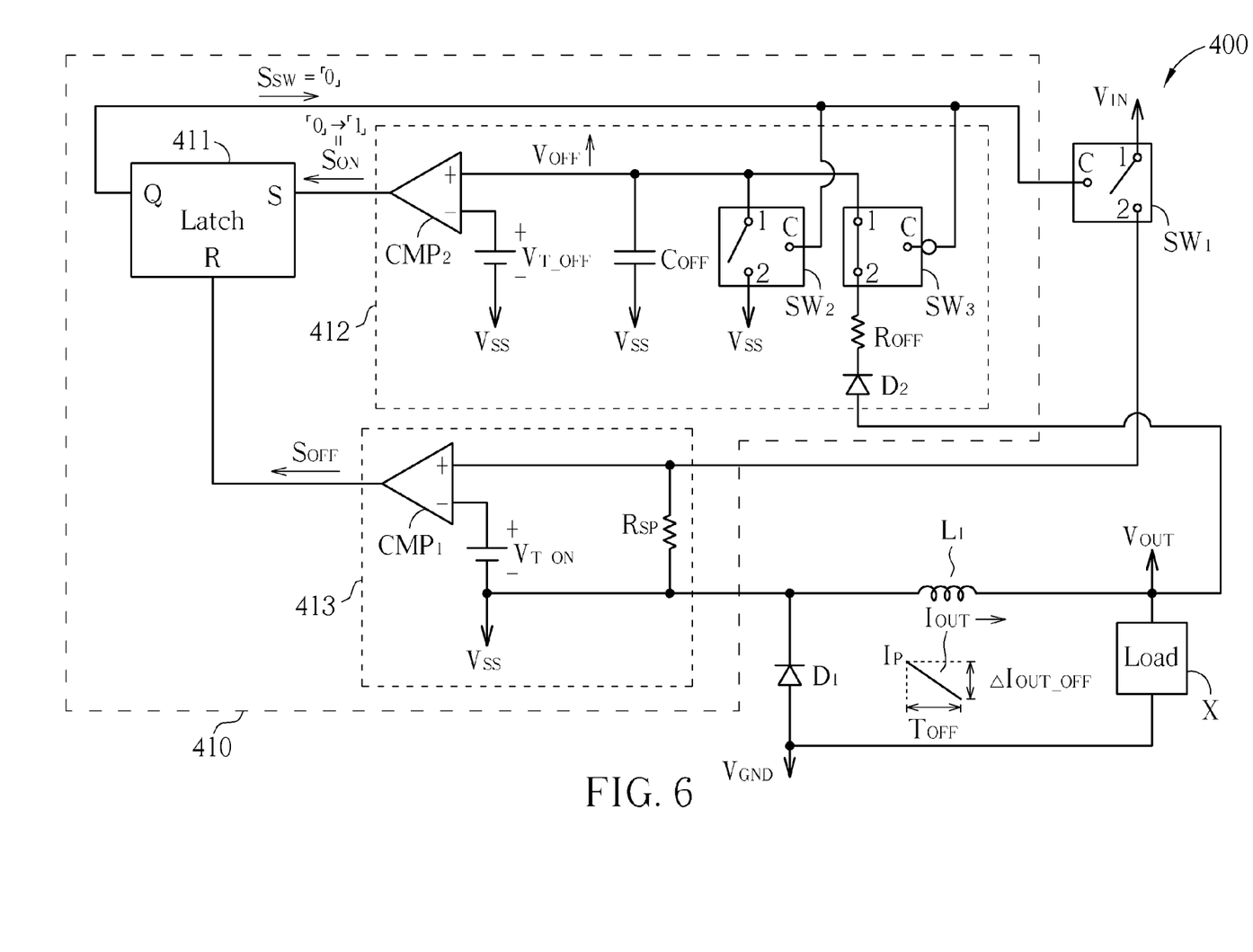
FIG. 6 is a diagram illustrating when the constant current driving system of FIG. 4 is in the discharging state.

Please refer to FIG. 6. FIG. 6 is a diagram illustrating when the constant current driving system 400 of the present invention is in the discharging state. As illustrated in FIG. 6, the power switch $SW_1$ is turned off in the charging state. In other words, during the OFF time $T_{OFF}$, the power switch $SW_1$ is turned off, the switch control signal $S_{SW}$ represents "OFF" (e.g. logic "0"), the switch $SW_2$ is turn off and the inverse switch $SW_3$ is turned on. Under this state (the latch 411 outputting the switch control signal $S_{SW}$ which represents "OFF", and the power switch $SW_1$ being turned off), the ON timer 413 can be considered non-operational, and the OFF timer 412 is activated for continuously comparing the turn-off voltage $V_{OFF}$ and the turn-off threshold voltage $V_{T\_OFF}$. During the OFF time $T_{OFF}$, since the turn-off capacitor $C_{OFF}$ is charged by the output voltage source $V_{OUT}$, the turn-off voltage $V_{OFF}$ continues to increase. When the turn-off voltage $V_{OFF}$ equals the turn-off threshold voltage $V_{T\_OFF}$, it means the charging has completed, and the OFF timer 412 outputs the ON signal $S_{ON}$ which represents "turn on" (e.g. logic "1") to the set end S of the latch 411 for setting the switch control signal $S_{SW}$ to represent "ON" (e.g. logic "1"); the OFF time $T_{OFF}$ is ended at this instant and the ON time $T_{ON}$ begins. In other words, when the latch 411 outputs the switch control signal $S_{SW}$ which represents "OFF" or when the power switch $SW_1$ is turned off, the OFF timer 412 is activated to begin timing for calculating the duration of the OFF time $T_{OFF}$ according to the charging rate of the output voltage source $V_{OUT}$ charging the turn-off capacitor $C_{OFF}$ via the turn-off resistor $R_{OFF}$.

Moreover, since the voltage source $V_{SS}$ is provided via the power switch $SW_1$ and the peak current sensing resistor $R_{SP}$, the magnitude of the voltage source $V_{SS}$ varies as the power switch $SW_1$ is turned on or turned off. More specifically, when the power switch $SW_1$ is turned on, the voltage level of the voltage source $V_{SS}$ is relatively higher; when the power switch $SW_1$ is turned off, the voltage level of the voltage source $V_{SS}$ is relatively lower.

Figure 7:
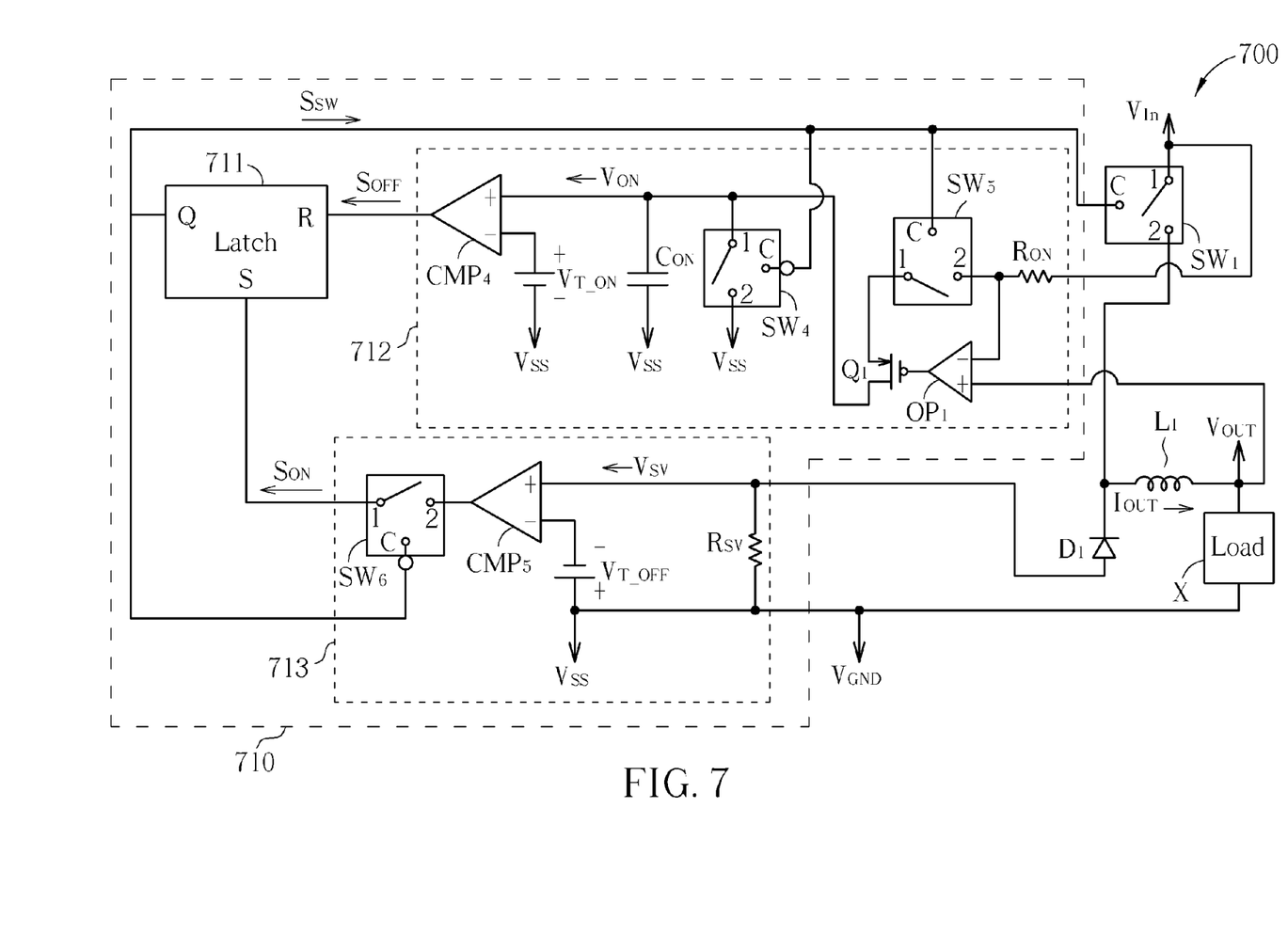
FIG. 7 is a diagram illustrating a constant current driving system according to the second embodiment of the present invention.

Please refer to FIG. 7. FIG. 7 is a diagram illustrating a constant current driving system 700 according to the second embodiment of the present invention. The constant current driving system 700 comprises a constant current driving circuit 710, a power switch $SW_1$, an inductor $L_1$ and a diode $D_1$. The constant current driving system 700 is utilized to convert the input voltage source $V_{IN}$ to provide the output current $I_{OUT}$ and the output voltage $V_{OUT}$ to the load X. The diode $D_1$ is coupled between the first end of the inductor $L_1$ and a reference voltage source $V_{GND}$; the load X is coupled between the output voltage source $V_{OUT}$, the second end of the inductor $L_1$ and the reference voltage source $V_{GND}$. The reference voltage source $V_{GND}$ can be the ground end of the constant current driving system 700. The constant driving circuit 710 outputs the switch control signal $S_{SW}$ for controlling the power switch $SW_1$ to be turned on (closed) or turned off (open). The constant current driving circuit 710 detects the valley current of the output current $I_{OUT}$ for controlling the OFF time $T_{OFF}$ of the power switch $SW_1$; the constant current driving circuit 710 controls the ON time $T_{ON}$ of the power switch $SW_1$ according to the input voltage $V_{IN}$ and the output voltage $V_{OUT}$. The detailed operational principle is explained hereinafter.

The constant current driving circuit 710 comprises a latch 711, an ON timer 712 and an OFF timer 713.

The latch 711 is similar to the above mentioned latch 411, so descriptions of the relative operations are omitted hereinafter.

The OFF timer 713 comprises a valley current sensing resistor $R_{SV}$, a comparator $CMP_5$ and an inverse switch $SW_6$. The first end of the valley current sensing resistor $R_{SP}$ is coupled between the negative end of the diode $D_1$ and the positive end of the comparator $CMP_5$, for providing a valley current sensing voltage $V_{SV}$; the second end of the valley current sensing resistor $R_{SV}$ is coupled between the voltage source $V_{GND}$ and the negative input end of the comparator $CMP_5$, for providing the reference voltage source $V_{SS}$, meaning the voltage source $V_{GND}$ is equivalent to the reference voltage source $V_{SS}$. The reference voltage source $V_{SS}$ can be the ground end of the constant current driving circuit 710. The negative input end of the comparator $CMP_5$ is utilized to receive the turn-off threshold voltage $V_{T\_OFF}$ (i.e. constant). The comparator $CMP_5$ compares the valley current sensing voltage $V_{SV}$ and the turn-off threshold voltage $V_{T\_OFF}$, for outputting the corresponding ON signal $S_{ON}$ accordingly. It is noted that the turn-off threshold voltage $V_{T\_OFF}$ is of a negative value. When the valley current sensing voltage $V_{SV}$ is lower than the turn-off threshold voltage $V_{T\_OFF}$, it means the output current $I_{OUT}$ has not reached the predetermined valley current threshold $I_V$, so the comparator $CMP_5$ outputs the ON signal $S_{ON}$ (e.g. logic "0"), which represents "do not turn on"; when the valley current sensing voltage $V_{SV}$ is higher that the turn-off threshold voltage $V_{T\_OFF}$, it means the output current $I_{OUT}$ has reached the predetermined valley current threshold $I_V$, so the comparator $CMP_5$ outputs the ON signal $S_{ON}$ (e.g. logic "1") representing "turn on". The inverse switch $SW_6$ comprises a first end 1, a second end 2 and a control end C. The first end 1 of the inverse switch $SW_6$ is coupled to the set end S of the latch 711; the second end 2 of the inverse switch $SW_6$ is coupled to the output end of the comparator $CMP_5$; the control end C of the inverse switch $SW_6$ is coupled to the output end Q of the latch 711 for receiving the switch control signal $S_{SW}$. When the switch control signal $S_{SW}$ is represented as "ON" (e.g. logic "1"), the inverse switch $SW_6$ is turned off, so the latch 711 does not receive the ON signal $S_{ON}$; when the switch control signal $S_{SW}$ is represented as "OFF" (e.g. logic "0"), the inverse switch $SW_6$ is turned on, so the latch 711 receives the ON signal $S_{ON}$ generated from the comparator $CMP_5$ via the inverse switch $SW_6$.

The ON timer 712 comprises a comparator $CMP_4$, a turn-on capacitor $C_{ON}$, an inverse switch $SW_4$, a switch $SW_5$, a turn on resistor $R_{ON}$, a transistor $Q_1$ and an amplifier $OP_1$.

The positive end of the comparator $CMP_4$ is utilized to receive the turn-on voltage $V_{ON}$; the negative end of the comparator $CMP_4$ is utilized to receive the turn-on threshold voltage $V_{T\_ON}$ (i.e. constant); the comparator $CMP_4$ compares the turn-on voltage $V_{ON}$ and the turn-on threshold voltage $V_{T\_ON}$ for outputting the corresponding OFF signal $S_{OFF}$ accordingly. When the turn-on voltage $V_{ON}$ is lower than the turn-on threshold voltage $V_{T\_ON}$, it means the ON time $V_{ON}$ of the power switch $SW_1$ has not finished, so the comparator $CMP_4$ outputs the OFF signal $S_{OFF}$ (e.g. logic "0") which represents "do not turn off"; when the turn-on voltage $V_{ON}$ is higher than the turn-on threshold voltage $V_{T\_ON}$, it means the ON time $V_{ON}$ of the power switch $SW_1$ has finished, so the comparator $CMP_4$ outputs the OFF signal $S_{OFF}$ (e.g. logic "1") which represents "turn off".

The turn-on capacitor $C_{ON}$ is coupled between the positive input end of the comparator $CMP_4$ and the voltage source $V_{SS}$. The inverse switch $SW_4$ is coupled between the positive input end of the comparator $CMP_4$ and the voltage source $V_{SS}$. The first end of the transistor $Q_1$ is coupled to the positive input end of the comparator $CMP_4$; the second end of the transistor $Q_1$ is coupled to the first end 1 of the switch $SW_5$; the control end of the transistor $Q_1$ is coupled to the output end of the amplifier $OP_1$. The first end 1 of the switch $SW_5$ is coupled to the second end of the transistor $Q_1$; the second end 2 of the switch $SW_5$ is coupled to the negative input end of the amplifier $OP_1$ and further coupled to the input voltage source $V_{IN}$ via the turn-on resistor $R_{ON}$ for receiving the input voltage $V_{IN}$. The control ends C of the inverse switches $SW_4$ and the switch $SW_5$ are both coupled to the output end Q of the latch 711 for receiving the switch control signal $S_{SW}$. Furthermore, the positive input end of the amplifier $OP_1$ is coupled to the output voltage source $V_{OUT}$ for receiving the output voltage $V_{OUT}$. The transistor $Q_1$ can be a PMOS (P-channel Metal Oxide Semiconductor) transistor.

When the switch control signal $S_{SW}$ is represented as "OFF" (e.g. logic "0"), the inverse switch $SW_4$ is turned on for the positive input end of the comparator $CMP_4$ to be coupled to the voltage source $V_{SS}$, and starts charging the turn-on capacitor $C_{ON}$ for pulling the turn-on voltage $V_{ON}$ to the voltage level of the voltage source $V_{SS}$; the switch $SW_5$ is also turned off, so no current flows from the input voltage source $V_{IN}$ through the turn-on resistor $R_{ON}$, and the transistor $Q_1$ is turned off; this way, the turn-on voltage $V_{ON}$ continues to stay lower than the turn-on threshold voltage $V_{T\_ON}$, so the ON timer 712 continues to output the OFF signal (e.g. logic "0"), which represents "do not turn on".

When the switch control signal $S_{SW}$ is represented as "ON" (e.g. logic "1"), the inverse switch $SW_4$ is turned off, so the turn-on capacitor $C_{ON}$ is not discharged by the voltage source $V_{SS}$ and the turn-on voltage $V_{ON}$ is not pulled to the voltage level of the voltage source $V_{SS}$; the switch $SW_5$ is also turned on for the transistor $Q_1$ to be turned on, and the current flowing through the transistor $Q_1$ is equivalent to $(V_{IN}-V_{OUT})/R_{ON}$. This current charges the turn-on capacitor $C_{ON}$ for the turn-on voltage $V_{ON}$ to continue increasing, until the turn-on voltage $V_{ON}$ is equaled to the turn-on threshold voltage $V_{T\_ON}$, at which time the ON timer 712 outputs the OFF signal $S_{OFF}$ (e.g. logic "1"), representing "turn off"; the ON time $T_{ON}$ of the power switch $SW_1$ is equivalent to the duration from when the above mentioned turn-on capacitor $C_{ON}$ starts charging to the instant when the turn-on voltage $V_{ON}$ is equal to the turn-on threshold voltage $V_{T\_ON}$. The ON time $T_{ON}$ of the power switch $SW_1$ can be calculated as below:

$$T_{ON} = C_{ON} \times V_{T\_ON} / [(V_{IN} - V_{OUT})/R_{ON}] \quad (9)$$
$$= V_{T\_ON} \times R_{ON} / (V_{IN} - V_{OUT}) \dots ;$$

By merging formula (9) into (6), the following formula can be obtained:

$$\Delta I_{OUT} = [(V_{IN} - V_{OUT})/L] \times T_{ON} \quad (10)$$
$$= [(V_{IN} - V_{OUT})/L] \times [V_{T\_ON} \times R_{ON} / (V_{IN} - V_{OUT})]$$
$$= K_2 \times R_{ON} / L \dots ;$$

Since K (i.e. $C_{ON} \times V_{T\_ON}$), $R_{ON}$ and L are all constants, the ripple current of the output current $I_{OUT}$ can then be controlled to within a predetermined range and the stability of the output current is improved.

When the set end S of the latch 711 receives the ON signal $S_{ON}$ which represents "turn on" (e.g. logic "1"), the latch 711 outputs the switch control signal $S_{SW}$ which represents "ON" (e.g. logic "1") at the output end Q; when the reset end R of the latch 711 receives the OFF signal $S_{OFF}$ which represents "turn off" (e.g. logic "0"), the latch 711 outputs the switch control signal $S_{SW}$ which represents "OFF" (e.g. logic "0") at the output end Q.

Figure 8:
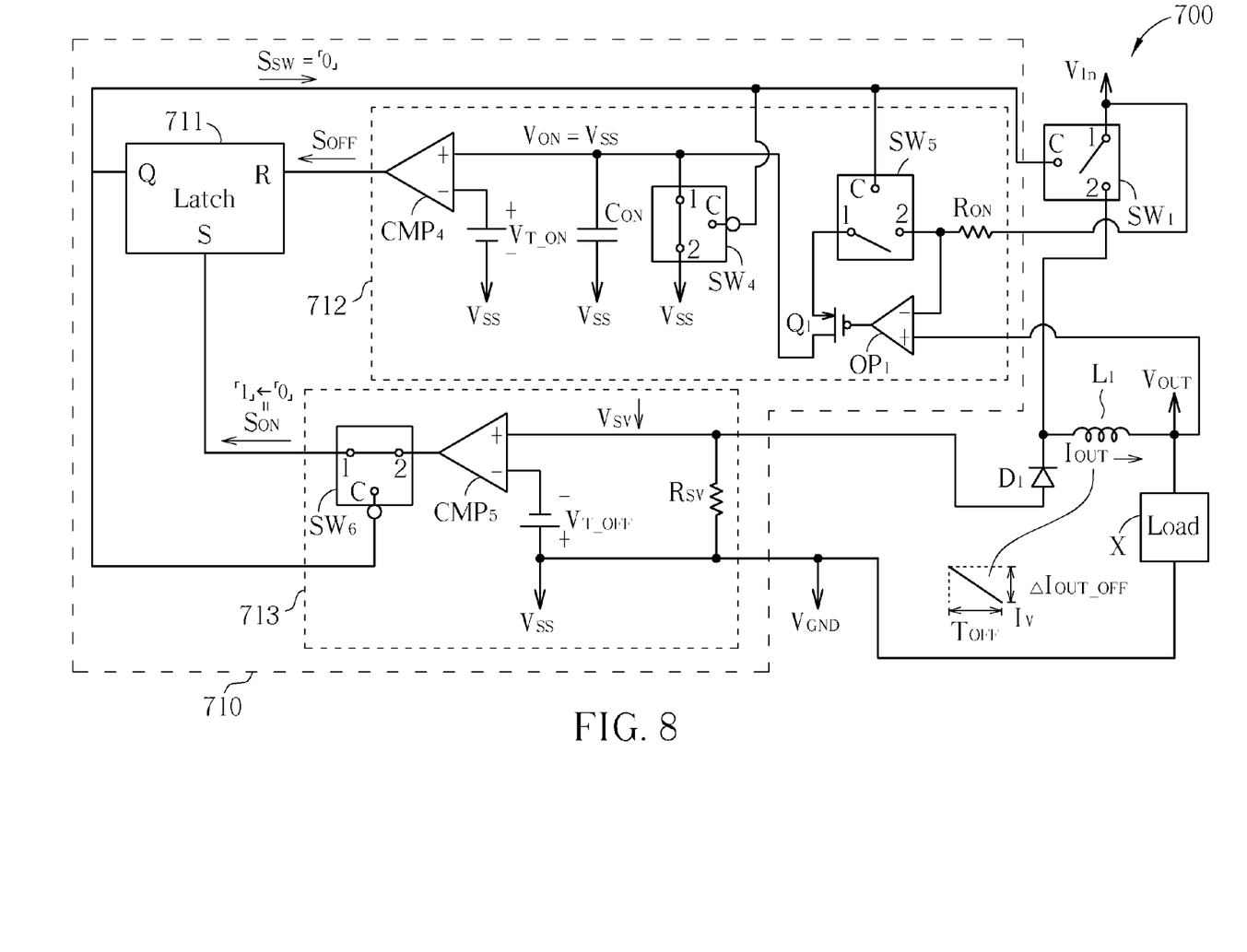
FIG. 8 is a diagram illustrating when the constant current driving system of FIG. 7 is in the discharging state.

Please refer to FIG. 8. FIG. 8 is a diagram illustrating when the constant current driving system 700 of the present invention is in the discharging state. As illustrated in FIG. 8, the power switch $SW_1$ is turned off in the discharging state. In other words, during the OFF time $T_{OFF}$, the power switch $SW_1$ is turned off, the switch control signal $S_{SW}$ represents "OFF" (e.g. logic "0"), the inverse switches $SW_4$ and $SW_6$ are turn on, and the switch $SW_5$ is turned off. Under this state, the ON timer 712 can be considered non-operational, and the OFF timer 713 continuously compares the valley current sensing voltage $V_{SV}$ and the turn-off threshold voltage $V_{T\_OFF}$. During the OFF time $T_{OFF}$, since the inductor $L_1$ cannot be charged via the input voltage source $V_{IN}$, the output current $I_{OUT}$ continues to decrease, meaning the valley current sensing voltage $V_{SV}$ continues to increase. When the valley current sensing voltage $V_{SV}$ is higher than the turn-off threshold voltage $V_{T\_OFF}$, it means the charging has been completed, and the OFF timer 713 outputs the ON signal $S_{ON}$ representing "turn on" (e.g. logic "1") to the set end S of the latch 711 for setting the switch control signal $S_{SW}$ to represent as "ON" (e.g. logic "1"); the OFF time TOFF is ended at this instant, and the ON time TON begins.

Figure 9:
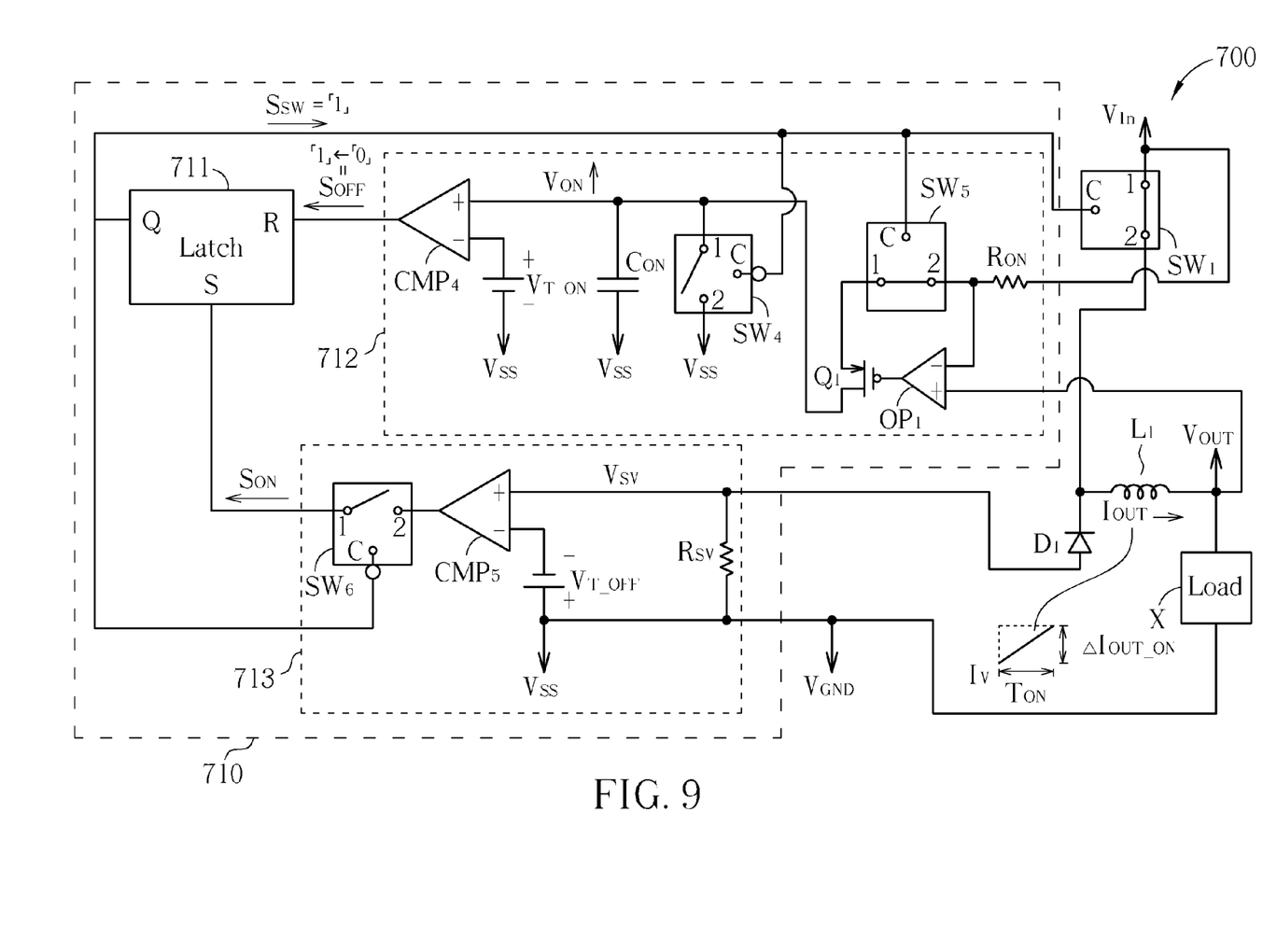
FIG. 9 is a diagram illustrating when the constant current driving system of FIG. 7 is in the charging state.

Please refer to FIG. 9. FIG. 9 is a diagram illustrating when the constant current driving system 700 of the present invention is in the charging state. As illustrated in FIG. 9, the power switch $SW_1$ is turned on in the charging state. In other words, during the ON time $T_{ON}$, the power switch $SW_1$ is turned on, the switch control signal $S_{SW}$ represents "ON" (e.g. logic "1"), the inverse switches $SW_4$ and $SW_6$ are turned off, and the switch $SW_5$ is turned on. Under this state, the OFF timer 713 can be considered non-operational (the ON signal $S_{ON}$ cannot reach the latch 711), and the ON timer 712 is activated for continuously comparing the turn-on voltage $V_{ON}$ and the turn-on threshold voltage $V_{T\_ON}$. During the ON time $T_{ON}$, since the turn-on capacitor $C_{ON}$ is charged through the input voltage source $V_{IN}$ and the output voltage source $V_{OUT}$, the turn-on voltage $V_{ON}$ continues to increase. When the turn-on voltage $V_{ON}$ is higher than the turn-on threshold voltage $V_{T\_ON}$, it means the charging has completed, and the ON timer 712 outputs the OFF signal $S_{OFF}$ which represents "turn off" (e.g. logic "1") to the reset end R of the latch 711 for setting the switch control signal $S_{SW}$ to represent "OFF" (e.g. logic "0"); the ON time $T_{ON}$ is ended at this instant and the OFF time $T_{OFF}$ begins. In other words, when the latch 711 outputs the switch control signal $S_{SW}$ which represents "ON" or when the power switch $SW_1$ is turned on, the ON timer 712 is activated to begin timing for calculating the duration of the ON time $T_{ON}$ according to the charging rate of the output voltage source $V_{OUT}$ charging the turn-on capacitor $C_{ON}$ via the turn-on resistor $R_{ON}$.

Furthermore, the load X can be realized, for instance, by at least one LED (Light Emitting Diode) connected in series. By utilizing the constant current driving system of the present invention to provide stable output current, the LED connected in series can steadily emit light with uniform brightness.

In conclusion, the constant current driving circuit is utilized, when detecting the peak value of the output current, to control the OFF time of the power switch according to the output voltage; the constant current driving circuit is also utilized, when detecting the valley current of the output current, to control the ON time of the power switch according to the input voltage and the output voltage, for providing stable output current.

Those skilled in the art will readily observe that numerous modifications and alterations of the device and method may be made while retaining the teachings of the invention.

What is claimed is:

1. A constant current driving system for stabilizing an output current, the constant current driving system comprising:
   a power switch, comprising:
      a first end, coupled to an input voltage source;
      a second end; and
      a control end, for receiving a switch control signal;
      wherein the input voltage source provides an input voltage;
      wherein when the switch control signal is asserted, the first end of the power switch is coupled to the second end of the power switch;
   an inductor, comprising:
      a first end; and
      a second end, for providing an output current and an output voltage;
   a first diode, comprising:
      a negative end, coupled to the first end of the inductor; and
      a positive end, coupled to a ground end; and
   a constant current driving circuit, comprising:
      a latch, comprising:
         an output end, for outputting the switch control signal;
         a set end, for receiving an ON signal; and
         a reset end, for receiving a OFF signal;
         wherein the latch outputs the switch control signal according to the ON signal and the OFF signal;
      an ON timer, for detecting whether the output current has reached a predetermined peak current value, and generating the OFF signal accordingly, the ON timer comprising:
         a peak current sensing resistor, comprising:
            a first end, coupled to the second end of the power switch, for generating a peak current sensing voltage; and
            a second end, coupled to the first end of the inductor, for generating a reference voltage source; and
         a first comparator, comprising:
            a first input end, for receiving the peak current sensing voltage;
            a second input end, for receiving a turn-on threshold voltage; and
            an output end, coupled to the reset end of the latch, for outputting the OFF signal;
            wherein a difference between the turn-on threshold voltage and a voltage generated by the reference voltage source is a constant;
            wherein when the peak current sensing voltage is higher than the turn-on threshold voltage, the first comparator outputs the OFF signal representing turn off;
      an OFF timer, for outputting the ON signal to control a time for which the switch control signal is unasserted according to the output voltage and the switch control signal; and
      a load, coupled between the second end of the inductor and the ground end of the constant current driving system.

2. The constant current driving system of claim 1, wherein when the latch receives the ON signal representing turn on, the latch outputs the switch control signal representing ON; and when the latch receives the OFF signal representing turn off, the latch outputs the switch control signal representing OFF.

3. The constant current driving system of claim 2, wherein when the output current has reached the predetermined peak current value, the ON timer outputs the OFF signal representing turn off.

4. The constant current driving system of claim 1, wherein when the switch control signal is unasserted, the OFF timer is activated and calculates time the ON signal is represented as turn on according the output voltage.

5. The constant current driving system of claim 4, wherein the OFF timer comprises:
   a second comparator, comprising:
      a first input end, for receiving a turn-off voltage;
      a second input end, for receiving a turn-off threshold voltage; and an output end, coupled to the set end of the latch, for outputting the ON signal;
wherein when the turn-off voltage is higher than the turn-off threshold voltage, the second comparator outputs the ON signal representing turn on;
wherein a difference between the turn-off threshold voltage and a voltage generated by the reference voltage source is a constant;
a turn-off capacitor, comprising:
a first end, coupled to the first input end of the second comparator, for generating the turn-off voltage; and
a second end, coupled to the reference voltage source;
a switch, comprising:
a first end, coupled to the first input end of the second comparator;
a second end, coupled to the reference voltage source; and
a control end, coupled to the output end of the latch, for receiving the switch control signal;
wherein when the switch control signal is asserted, the switch is turned on, and when the switch control signal is unasserted, the switch is turned off;
an inverse switch, comprising:
a first end, coupled to the first input end of the second comparator;
a second end; and
a control end, coupled to the output end of the latch, for receiving the switch control signal;
wherein when the switch control signal is represented as ON, the inverse switch is turned off, when the switch control signal is represented as OFF, the inverse switch is turned on;
a turn-off resistor, coupled to the second end of the inverse switch; and
a second diode, coupled between the turn-off resistor and the second end of the inductor, for receiving the output voltage.

6. The constant current driving system of claim 5, wherein the reference voltage source is a ground end of the constant current driving circuit.

7. The constant driving system of claim 1, wherein the load comprises at least one light emitting diode coupled in series.

8. A constant current driving system for stabilizing an output current, the constant current driving system comprising:
a power switch, comprising:
a first end, coupled to an input voltage source;
a second end; and
a control end, for receiving a switch control signal;
wherein the input voltage source provides an input voltage;
wherein when the switch control signal is asserted, the first end of the power switch is coupled to the second end of the power switch;
an inductor, comprising:
a first end, coupled to the second end of the power switch; and
a second end, for providing an output current and an output voltage;
a first diode, comprising:
a negative end, coupled to the first end of the inductor; and
a positive end, coupled to a ground end; and
a constant current driving circuit, comprising:
a latch, comprising:
an output end, for outputting the switch control signal;
a set end, for receiving an ON signal; and
a reset end, for receiving an OFF signal;
wherein the latch outputs the switch control signal according to the ON signal and the OFF signal;
an OFF timer, for detecting whether the output current has reached a predetermined valley current value, and generating the ON signal accordingly, the OFF timer comprising:
a valley current sensing resistor, comprising:
a first end, coupled to the positive end of the first diode, for generating a valley current sensing voltage; and
a second end, coupled to a ground end;
a first comparator, comprising:
a first input end, for receiving the valley current sensing voltage;
a second input end, for receiving a turn-off threshold voltage; and
an output end, for outputting the ON signal;
wherein a difference between the turn-off threshold voltage and a voltage provided by the ground end is a constant, and the turn-off threshold voltage is lower than the voltage provided by the ground end;
wherein when the valley current sensing voltage is higher than the turn-off threshold voltage, the first comparator outputs the ON signal representing turn on; and
a first inverse switch, comprising:
a first end, coupled to the set end of the latch;
a second end, coupled to the output end of the first comparator; and
a control end, coupled to the output end of the latch, for receiving the switch control signal;
wherein when the switch control signal is represented as OFF, the first end of the inverse switch is coupled to the second end of the first inverse switch;
an ON timer, for outputting the OFF signal according to the output voltage, the input voltage and the switch control signal, so as to control time for which the switch control signal is unasserted; and
a load, coupled to the second end of the inductor and the ground end.

9. The constant current driving system of claim 8, wherein when the latch has received the ON signal representing turn on, the latch outputs the switch control signal representing ON; and when the latch has received the OFF signal representing turn off, the latch outputs the switch control signal representing OFF.

10. The constant current driving system of claim 9, wherein when the output current has reached the predetermined valley current value, the OFF timer outputs the ON signal representing turn on.

11. The constant current driving system of claim 9, wherein when the switch control signal is asserted, the ON timer is activated and calculates a timing of the OFF signal being unasserted according to the output voltage and the input voltage.

12. The constant current driving system of claim 11, wherein the ON timer comprises:
a second comparator, comprising:
a first input end, for receiving a turn-on voltage;
a second input end, for receiving a turn-on threshold voltage; and
an output end, coupled to the reset end of the latch, for outputting the OFF signal;

wherein when the turn-on voltage is higher than the turn-on threshold voltage, the second comparator outputs the OFF signal representing turn off;

wherein a difference between the turn-off threshold voltage and a voltage provided by the ground end is a constant;

a turn-on capacitor, comprising:
  a first end, coupled to the first input end of the second comparator for generating the turn-on voltage; and
  a second end, coupled to the ground end;

a second inverse switch, comprising:
  a first end, coupled to the first input end of the second comparator;
  a second end, coupled to the ground end; and
  a control end, coupled to the output end of the latch, for receiving the switch control signal;
  wherein when the switch control signal is asserted, the second inverse switch is turned off, and when the switch control signal is unasserted, the second inverse switch is turned on;

a transistor, comprising:
  a first end, coupled to the first end of the second comparator;
  a second end; and
  a control end;

an amplifier, comprising:
  a first input end;
  a second input end, coupled to the second end of the inductor for receiving the output voltage; and
  an output end, coupled to the control end of the transistor;

a switch, comprising:
  a first end, coupled to the second end of the transistor;
  a second end, coupled to the first end of the amplifier; and
  a control end, coupled to the output end of the latch for receiving the switch control signal;
  wherein when the switch control signal is asserted, the switch is turned on, and when the switch control signal is unasserted, the switch is turned off; and a turn-on resistor, coupled between the second end of the switch and the input voltage source, for transmitting the input voltage to the second end of the transistor via the switch.

13. The constant current driving system of claim 8, wherein the load comprises at least one light emitting diode coupled in series.

* * * * *